United States Patent
Yanagi et al.

(10) Patent No.: US 8,179,269 B2
(45) Date of Patent: May 15, 2012

(54) INFORMATION PROCESSING APPARATUS

(75) Inventors: Masahiro Yanagi, Shinagawa (JP);
Satoshi Sakurai, Shinagawa (JP);
Shigemi Kurashima, Shinagawa (JP);
Takuya Uchiyama, Shinagawa (JP);
Takashi Yuba, Shinagawa (JP); Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 444 days.

(21) Appl. No.: 12/155,554

(22) Filed: Jun. 5, 2008

(65) Prior Publication Data
US 2009/0002180 A1    Jan. 1, 2009

(30) Foreign Application Priority Data
Jun. 6, 2007 (JP) .................... 2007-150989

(51) Int. Cl.
*G08B 23/00* (2006.01)
(52) U.S. Cl. .................. 340/575; 340/390.7; 340/573.1; 600/300; 702/127
(58) Field of Classification Search ............... 340/573.1, 340/439, 575, 309.7; 700/90; 600/300, 301; 702/108, 124, 127, 189; 382/118, 181; 348/108, 125
See application file for complete search history.

(56) References Cited

U.S. PATENT DOCUMENTS

| | | | |
|---|---|---|---|
| 7,088,250 B2 * | 8/2006 | Yasushi | 340/573.1 |
| 7,224,834 B2 * | 5/2007 | Nambu | 382/181 |
| 7,741,957 B2 * | 6/2010 | Wang et al. | 340/309.7 |
| 2002/0130887 A1 * | 9/2002 | Yamamoto | 345/619 |
| 2003/0158692 A1 * | 8/2003 | Tamada | 702/127 |
| 2006/0277467 A1 * | 12/2006 | Reponen et al. | 715/708 |
| 2007/0040691 A1 * | 2/2007 | Lau et al. | 340/573.1 |

FOREIGN PATENT DOCUMENTS

| | | |
|---|---|---|
| JP | 7-255128 | 10/1995 |
| JP | 2006-323702 | 11/2006 |

* cited by examiner

*Primary Examiner* — Brent Swarthout
(74) *Attorney, Agent, or Firm* — Staas & Halsey LLP (57) ABSTRACT

An information processing apparatus includes a fatigue determining portion determining whether an operator is tired or not by referring to fatigue information on the operator's fatigue, and a processing control portion causing a first display for recovering the operator to be shown on a display portion together with a working display on which the operator is working, when the fatigue determining portion determines that the operator is tired.

4 Claims, 7 Drawing Sheets

INFORMATION PROCESSING APPARATUS

BACKGROUND OF THE INVENTION

1. Field of the Invention

The present invention generally relates to an information processing apparatus, and more particularly to an information processing apparatus in which a display on a screen is configured on the basis of information on an operator's fatigue.

2. Description of the Related Art

Operators who use information processing terminals tend to be tired, since the operators carefully watch display portions of the information processing terminals. Japanese Patent Application Publication No. 7-255128 (hereinafter described as Document 1) discloses a proposal to switch a display on a screen of a monitoring and controlling system for a power system from a monitoring and controlling oriented display to a relaxation oriented display, when an operator's fatigue is detected. Japanese Patent Application Publication No. 2006-323702 (hereinafter described as Document 2) discloses another proposal to display not only an image of an operator during processing of a task or a processing history of the task on the screen of an information terminal but also the mental condition of the operator, when a task of the operator using the information terminal is changed.

The arts described in Documents 1 and 2 are capable of presenting a display for relaxation or the mental condition of the operator in association with the fatigue of the operator. However, the working efficiency may be degraded because the display on the screen is changed from a display involved in the present task to the relaxation oriented display or the display showing the mental condition of the operator. Further, it is required to recover the operator effectively.

SUMMARY OF THE INVENTION

The present invention has been made in view of the above-mentioned circumstances and aims to restrain the working efficiency from degrading and recover the operator effectively.

According to a first aspect of the present invention, there is provided an information processing apparatus including: a fatigue determining portion determining whether an operator is tired or not by referring to fatigue information on the operator's fatigue; and a processing control portion causing a first display for recovering the operator to be shown on a display portion together with a working display on which the operator is working, when the fatigue determining portion determines that the operator is tired.

According to a second aspect of the present invention, there is provided an information processing apparatus including: a fatigue determining portion determining whether an operator is tired or not by referring to fatigue information on the operator's fatigue; a processing control portion causing a plurality of displays for recovering the operator to be sequentially shown on a display portion on which the operator is working, when the fatigue determining portion determines that the operator is tired; and a memory storing information on the display with which the operator is recovered among the plurality of displays, wherein the fatigue determining portion determines again whether the operator is tired or not by referring to fatigue information that is obtained again, and the processing control portion selects and causes a display among the plurality of displays to be shown on the basis of the information on the displays with which the operator is recovered, when the fatigue determining portion determines the operator is tired.

According to a third aspect of the present invention, there is provided an information processing apparatus including: a fatigue determining portion determining whether an operator is tired or not by referring to fatigue information on the operator's fatigue; and a processing control portion causing a first display for recovering the operator to be shown on a display portion on which the operator is working, when the fatigue determining portion determines whether the operator is tired, wherein the fatigue determining portion determines again whether the operator is tired or not on the basis of the fatigue information that is obtained again after the processing control portion causes the first display to be shown on the display portion, and the processing control portion causes a second display for recovering the operator to be shown on the display portion, when the fatigue determining portion determines again that the operator is tired.

According to a fourth aspect of the present invention, there is provided an information processing apparatus including: a fatigue determining portion determining whether an operator is tired or not by referring to fatigue information on the operator's fatigue; and a processing control portion causing a first display for recovering the operator to be shown on a display portion on which the operator is working, when the fatigue determining portion determines whether the operator is tired, wherein the fatigue determining portion determines again whether the operator is tired or not on the basis of fatigue information that is obtained again after the processing control portion causes the first display to be shown on the display portion, and the processing control portion makes the operator stop processing the work, when the fatigue determining portion determines again that the operator is tired.

DESCRIPTION OF THE PREFERRED EMBODIMENTS (First Embodiment)

Figure 1A:
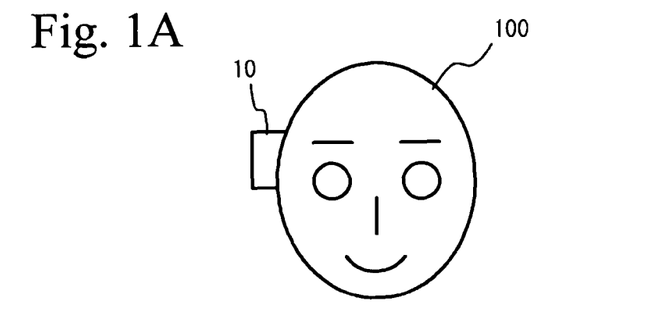
FIG. 1A is a pattern diagram of an operator wearing a brain wave detecting apparatus.

FIG. 1A shows an appearance of an operator 100, who is working with an information processing terminal and wearing a brain wave detecting apparatus 10. The operator 100 wears the brain wave detecting apparatus 10 so that brain wave sensors of the apparatus 100 contact a scalp of the operator 100.

Figure 1B:
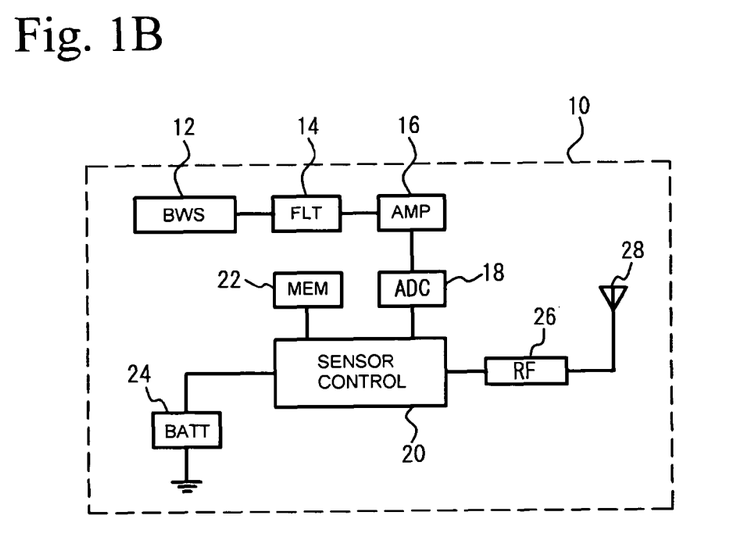
FIG. 1B is a block diagram of the brain wave detecting apparatus and FIG. 1C is a block diagram of a display control apparatus and an information processing terminal.

FIG. 1B is a block diagram of the brain wave detecting apparatus 10. The brain wave detecting apparatus 10 is composed of a brain wave sensor 12, a filter 14, an amplifier 16, an analog/digital conversion circuit (ADC) 18, a sensor control portion 20, a memory 22, a battery 24, an RF (radio frequency) circuit 26 and an antenna 28. An analog brain wave signal of the operator 100 detected by the brain wave sensor 12 goes through the filter 14 so as to remove noises of unnecessary frequencies. The brain wave signal is amplified by the amplifier 16, and is converted to a digital brain wave signal by the ADC 18. The sensor control portion 20 receives the converted digital brain wave signal. The sensor control portion 20 may be composed of a CPU (central processing unit), and transmits the brain wave signal transmitted from the brain wave sensor 12 to the RF circuit 26 as information on the brain wave. The RF circuit 26 modulates a high-frequency signal by the information on the brain wave. The antenna 28 transmits the RF signal. The battery 24 supplies electrical power to the sensor control portion 20 and so on.

Figure 1C:
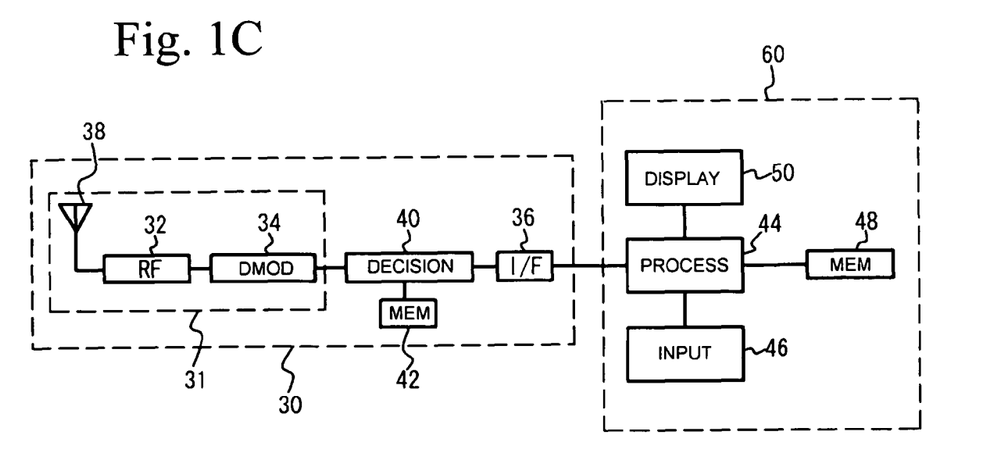

FIG. 1C is a block diagram of a brain wave receiving apparatus 30 and an information processing terminal 60 (such as personal computer). The brain wave receiving apparatus 30 is composed of an RF circuit 32, a demodulation circuit 34, an I/F (interface) circuit 36, an antenna 38, a fatigue determining portion 40 and a memory 42. The information processing terminal 60 is composed of a processing portion 44 (processing control portion), an input portion 46, a memory 48 and a display portion 50.

A receiving portion 31 includes the antenna 38, the RF circuit 32 and the demodulation circuit 34. The receiving portion 31 obtains brain wave information on the fatigue of the operator 100 from the brain wave detecting apparatus 10. A high-frequency signal including the brain wave information received by the antenna 38 is amplified by the RF circuit 32 and is converted to an intermediate frequency signal. The brain wave information is demodulated from the intermediate frequency signal by the demodulation circuit 34. The fatigue determining portion 40 may be composed of a CPU, and determines whether the operator 100 is tired or not by referring to the brain wave information. The information as to whether the operator 100 is tired or not is transmitted to the information processing terminal 60 via the interface circuit 36. The memory 42 memorizes a wide variety of information on the fatigue determining portion 40.

The processing portion 44 receives the signal from the brain wave receiving apparatus 30. The processing portion 44 may be composed of a CPU, and creates a working display on which the operator 100 is working on the display portion 50. The processing portion 44 selects a display to be shown on the display portion 50 and causes the display to be shown on or cleared from the display portion 50 by referring to the information as to whether the operator 100 is tired or not. Further, the processing portion 44 executes or suspends the work in which the operator 100 is processing. The input portion 46 may include a keyboard and/or a mouse with which the operator 100 uses in processing the work. The memory 48 may be a volatile or a nonvolatile memory in which the information on processing of the processing portion 44 is memorized.

Figure 2:
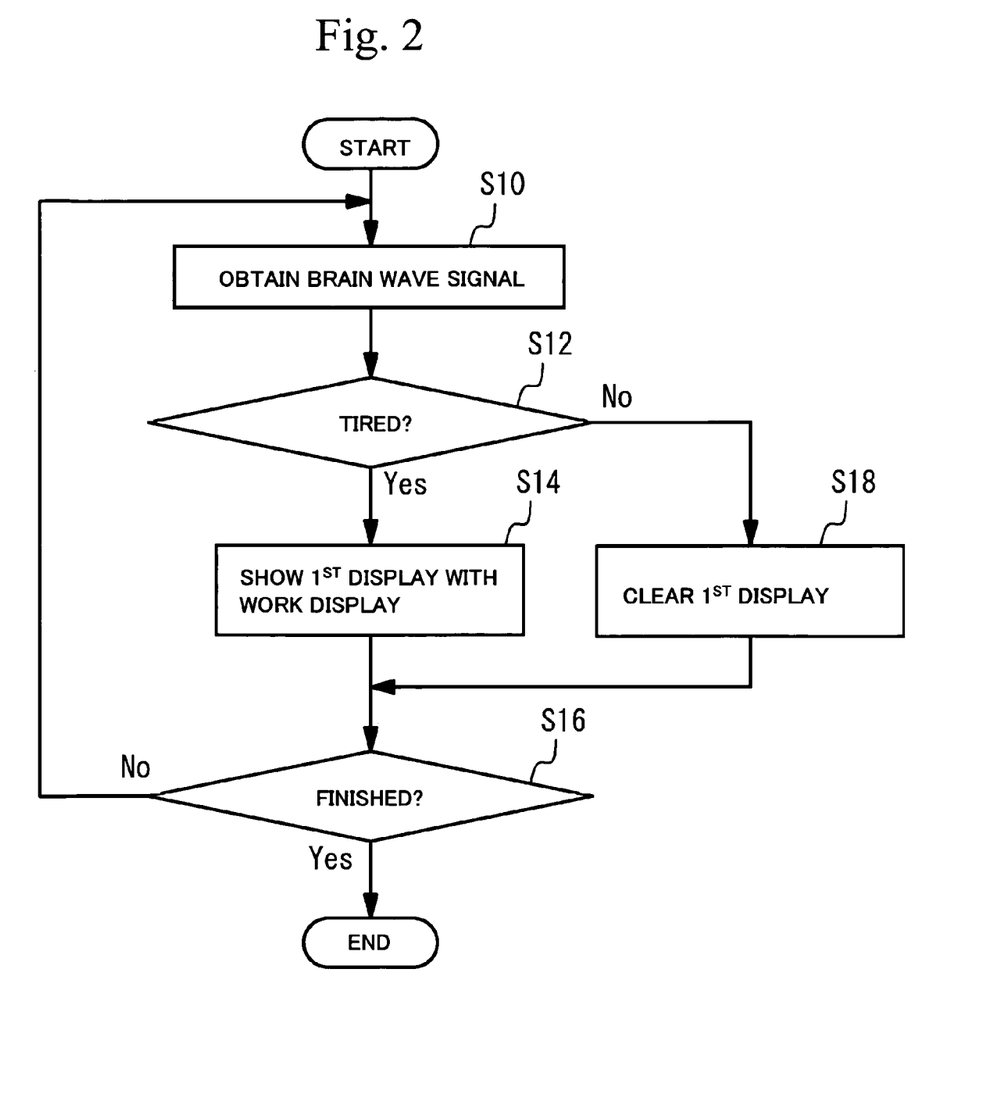
FIG. 2 is a flowchart of an operation of the display control apparatus in accordance with a first embodiment.

FIG. 2 is a flowchart of an operation of the brain wave receiving apparatus 30 and the information processing terminal 60. The operator 100 is processing the work with watching the display portion 50, wearing the brain wave detecting apparatus 10 on the head as shown in FIG. 1A. The receiving portion 31 receives brain wave information that is transmitted by the brain wave detecting apparatus 10 (step S110). The fatigue determining portion 40 obtains the brain wave information from the receiving portion 31, and determines whether the operator 100 is tired or not, by referring to the brain wave information (step S112). For example, the fatigue determining portion 40 determines that the operator 100 is tired when the α wave is large as compared to the other brain waves, and determines that the operator 100 is relaxed when the β wave is large as compared to the other brain waves.

Then, the fatigue determining portion 40 transmits the information whether the operator 100 is tired or not to the processing portion 44.

Figure 3:
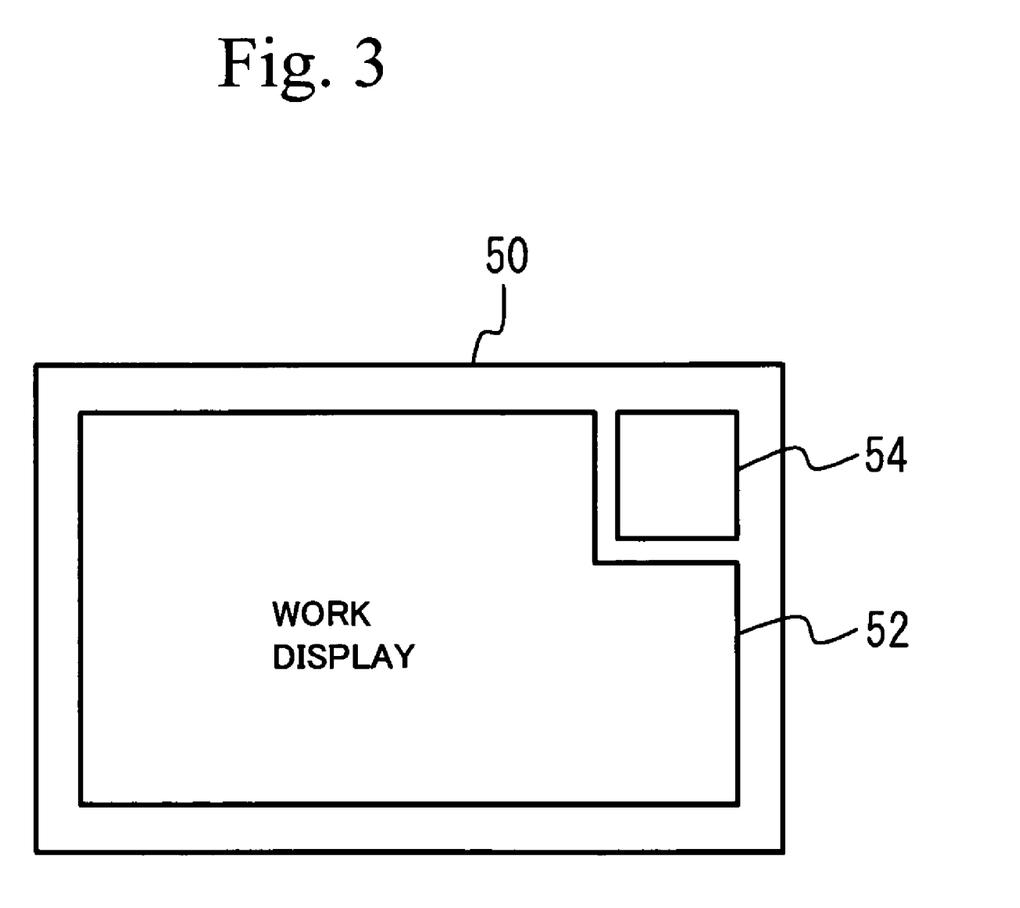
FIG. 3 is a pattern diagram of displays on a display portion.

When the answer is Yes in step S12, the processing portion 44 receives the information that indicates the operator 100 is tired. As shown in FIG. 3, the processing portion 44 causes a first display 54 for recovering the operator 100 to be displayed on the display portion 50 together with the working display 52 (step S14). The first display 54 may include comments such as "You need a break.", "Let's splash your face with cold water.", or "Let's have a break!", or may be images such as animals or nature. The comments or images may be blinking or lightning. It is preferable that the first display 54 is smaller than the working display 52 so as not to interrupt the work of the operator 100. After that, the processing portion 44 proceeds to step S16.

To the contrary, when the answer is No in step S12, the processing portion 44 receives the information that the operator 100 is not tired. If the first display 54 is displayed on the display portion 50, the processing portion 44 clears the first display 54 (step S18). After that, the processing portion 44 proceeds to step S16. In step S16, the processing portion 44 determines whether the process is finished or not. If the answer is No, the processing portion 44 goes back to step S110, and the answer is Yes, the process is finished.

In accordance with the first embodiment, the processing portion 44 (processing control portion) causes the first display for recovering the operator 100 to be shown on the display portion 50 together with the working display 52 on which the operator 100 is working, when the fatigue determining portion 40 determines the operator 100 is tired by referring to the brain wave information. In the proposals described in Documents 1 and 2, when the fatigue of the operator 100 is detected, who is operating the information processing terminal 60, the working efficiency is degraded because the working display 52 is switched to another display to prevent the operator from continuing to work. Meanwhile, in the first embodiment, since the processing portion 44 displays the first display 54 together with the working display 52 on the display portion 50, it is possible to restrain the working efficiency from being degraded.

(Second Embodiment)

Figure 4:
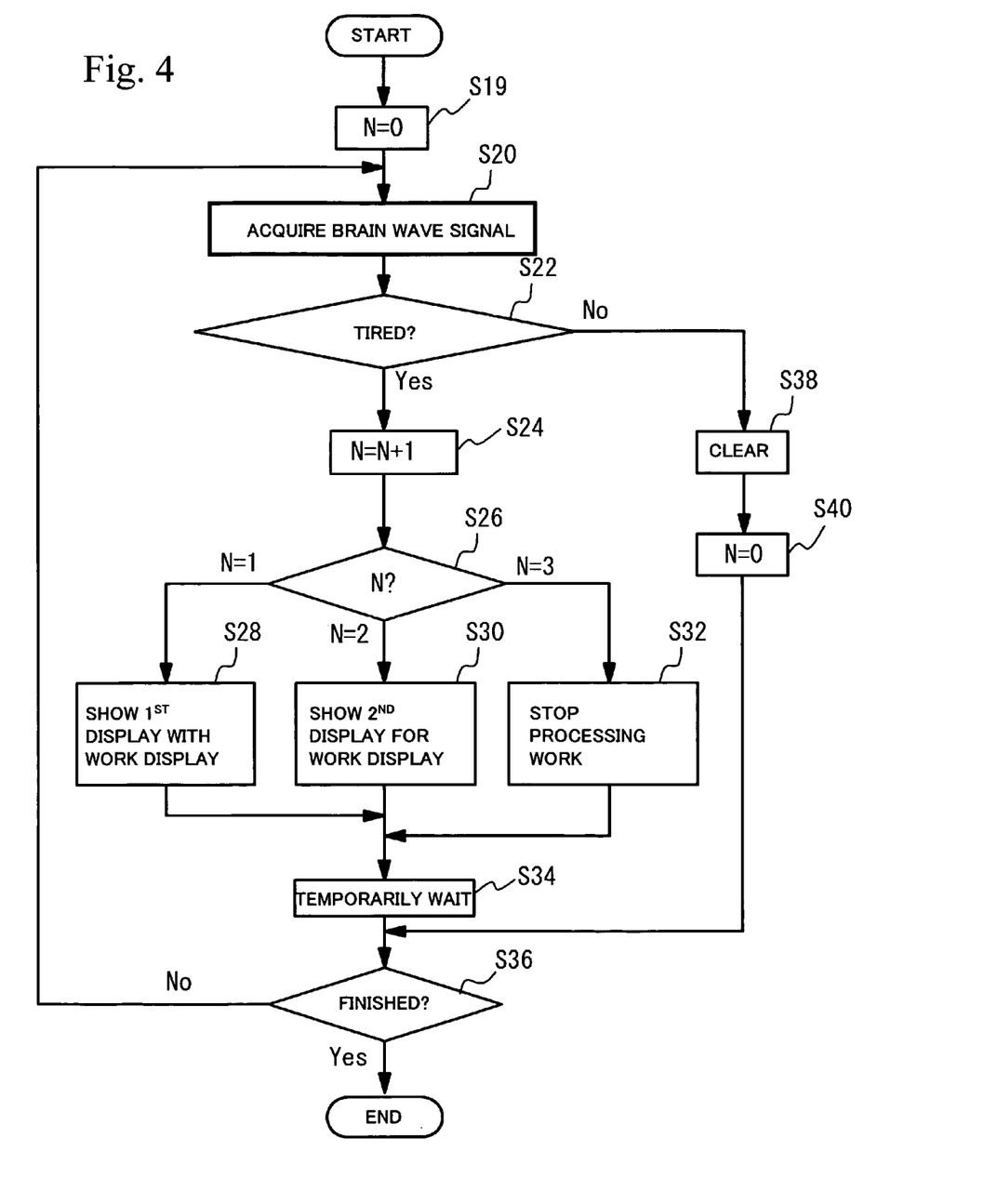
FIG. 4 is a flowchart of an operation of a display control portion in accordance with a second embodiment.

A second embodiment has the same block structure as shown in FIGS. 1B and 1C. FIG. 4 is a flowchart of an operation of the brain wave receiving apparatus 30 and the information processing terminal 60 in accordance with the second embodiment. With reference to FIG. 4, when the operator 100 starts to work, the processing portion 44 sets N equal to zero (N=0) (step S19). The receiving portion 31 receives brain wave information transmitted by the brain wave detecting apparatus 10 (step S20). The fatigue determining portion 40 obtains the brain wave information from the receiving portion 31, and consequently determines whether the operator 100 is tired or not (step S22). If the answer is Yes, the processing portion 44 sets N equal to N+1 (N=N+1) (step S24). Then, the processing portion 44 determines the number of N (step S26). When N is 1, the processing portion 44 causes the first display 54 for recovering the operator 100 to be shown on the display portion 50 as shown in FIG. 3 (step S28).

Figure 5A:
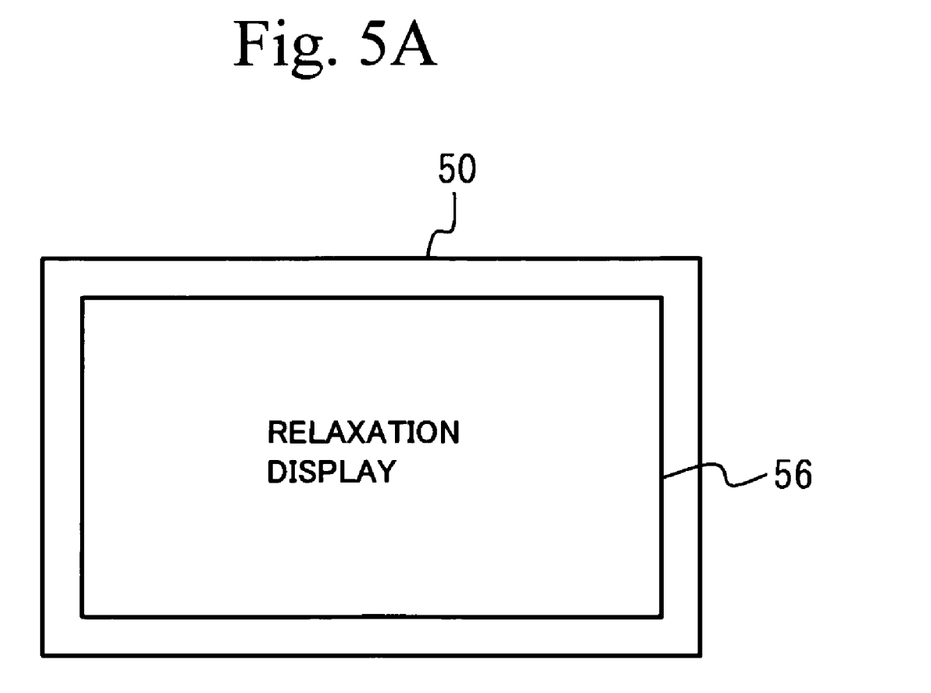
FIGS. 5A and 5B are pattern diagrams of displays on display portions, respectively.
Figure 5B:
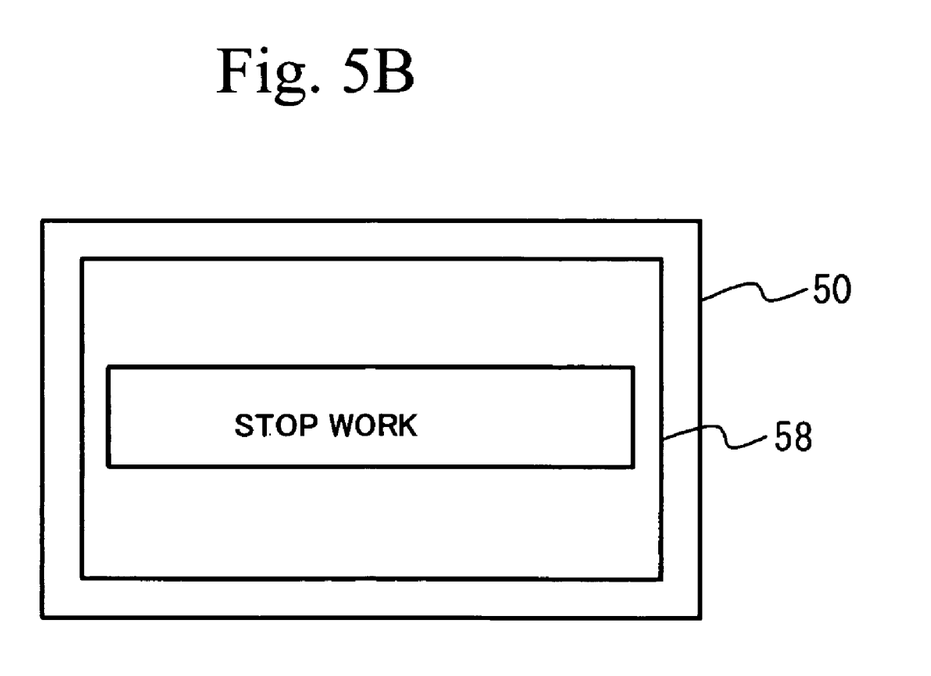

When N is 2 in step S26, the processing portion 44 causes a second display 56 to be shown on the display portion 50 instead of the working display 52 as shown in FIG. 5A (step S30). The second display 56 is aimed at recovering the operator 100, and may be an image of kitty, a dark background image, a relaxation display such as babbling stream image, or an image with a comment. The comment may be blinking or lightning. When N is 3 in step S26, the processing portion 44 causes a message for stopping the work to be shown on the display portion 50 as a third display 58 as shown in FIG. 5B, and makes the operator 100 stop processing the work (step S32). It may not be required to stop processing the work completely. For example, when the operator 100 is writing an e-mail, only a limited control to prevent a button for sending the e-mail from being clicked may be employed. Only a part of the work may be stopped. The processing portion 44 waits for a predetermined time (step S34). The predetermined time can be set arbitrarily. After that, the processing portion 44 proceeds to step S36.

When the answer is No in step S22, the processing portion 44 clears the first display 54 or the second display 56, if the first display 54 or the second display 56 is shown on the display portion 50. If the operator 100 has stopped processing the work, the processing portion 44 restarts the work. The processing portion 44 clears the processes of steps S28 through S32 (step S38). The processing portion 44 sets N equal to zero (N=0) (step S40) before the processing portion 44 proceeds to step S36. In step S36, the processing portion 44 determines whether the process is finished or not. If the answer is No, the processing portion 44 goes back to step S20, and if the answer is Yes, the process is finished.

According to the second embodiment, after the processing portion 44 causes the first display 54 to be shown on the display portion 50 in step S28, the receiving portion 31 receives again brain wave information in step S20. In step S22, the fatigue determining portion 40 determines again whether the operator 100 is tired or not by referring to the brain wave information that is obtained again. When the fatigue determining portion 40 determines again that the operator 100 is tired, the processing portion 44 causes the second display 56 to be shown on the display portion 50 instead of the working display 52 in step S30. Further, after the processing portion 44 causes the second display 56 to be displayed on the display portion 50 in step S30, the receiving portion 31 receives again brain wave information in step S20. In step S22, the fatigue determining portion 40 determines again whether the operator 100 is tired or not by referring to the brain wave information that is obtained again. If the fatigue determining portion 40 determines again that the operator 100 is tired, the processing portion 44 causes the operator 100 to stop processing the work.

As described above, when the operator 100 is determined to be tired, the first display 54 is shown together with the working display 52 at first. This step is not much effective to recover the operator, but prevents the working efficiency from being degraded greatly. Further, if the fatigue determining portion 40 determines that the operator 100 is not recovered after the predetermined time, the processing portion 44 causes the second display 56 to be shown instead of the working display 52. This step may degrade the working efficiency, but it is much effective to recover the operator 100. Furthermore, if the fatigue determining portion 40 determines again that the operator 100 is not recovered after another predetermined time, the processing portion 44 makes the operator 100 stop processing the work, which degrades the working efficiency greatly, but it has mostly effective to recover the operator 100. As above, actions for recovering the operator 100 are arranged in stages, it is possible to restrain the working efficiency of the operator 100 from being degraded, and recover the operator 100.

Although the effect of the third embodiment may be smaller than that of the second embodiment, step S32 may be operated after step S28 without step S30. The first display 54 may be shown solely instead of the combined display with the working display 52.

(Third Embodiment)

Figure 6:
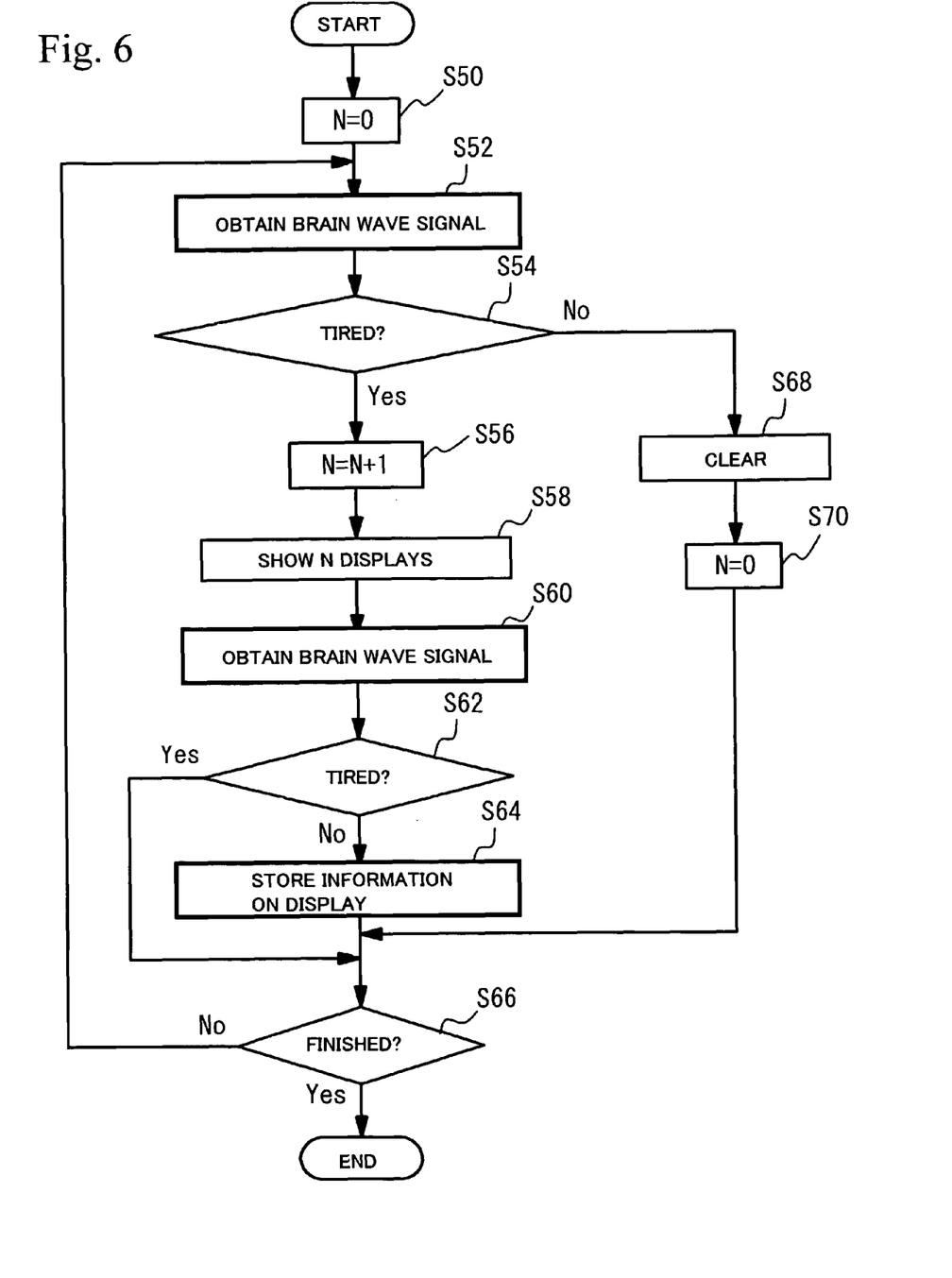
FIG. 6 is a flowchart of an initial operation of a display control apparatus in accordance with a third embodiment.

A third embodiment has the same block configuration as shown in FIGS. 1B and 1C. FIG. 6 is a flowchart of an initial operation of the brain wave receiving apparatus 30 and the information processing terminal 60 in accordance with the third embodiment. With reference to FIG. 6, the processing portion 44 sets N equal to zero (N=0), when the operator 100 starts to work (step S50). The receiving portion 31 receives brain wave information that is transmitted by the brain wave detecting apparatus 10 (step S52). The fatigue determining portion 40 obtains the brain wave information from the receiving portion 31, and determines whether the operator 100 is tired or not (step S54). If the answer is Yes, the processing portion 44 sets N equal to N+1 (N=N+1) (step S56), and causes an N-th display to be shown on the display portion 50 (step S58). The receiving portion 31 receives again brain wave information that is transmitted by the brain wave detecting apparatus 10 (step S60). The fatigue determining portion 40 obtains again the brain wave information from the receiving portion 31, and determines again whether the operator 100 is tired or not by referring to the brain wave information (step S62). If the answer is Yes, the processing portion 44 proceeds to step S66. If the answer is No, the processing portion 44 causes the memory 48 to memorize the information on the N-th display (for example N) (step S64). After that, the processing portion 44 proceeds to step S66.

When the answer is No in step S54, the processing portion 44 clears a display on the display portion 50 (step S68). The processing portion 44 sets N equal to zero (N=0) (step S70), and the processing portion 44 proceeds to step S66. In step S66, the processing portion 44 determines whether the process is finished or not. If the answer is No, the processing portion 44 goes back to step S52, and if the answer is Yes, the process is finished.

Figure 7:
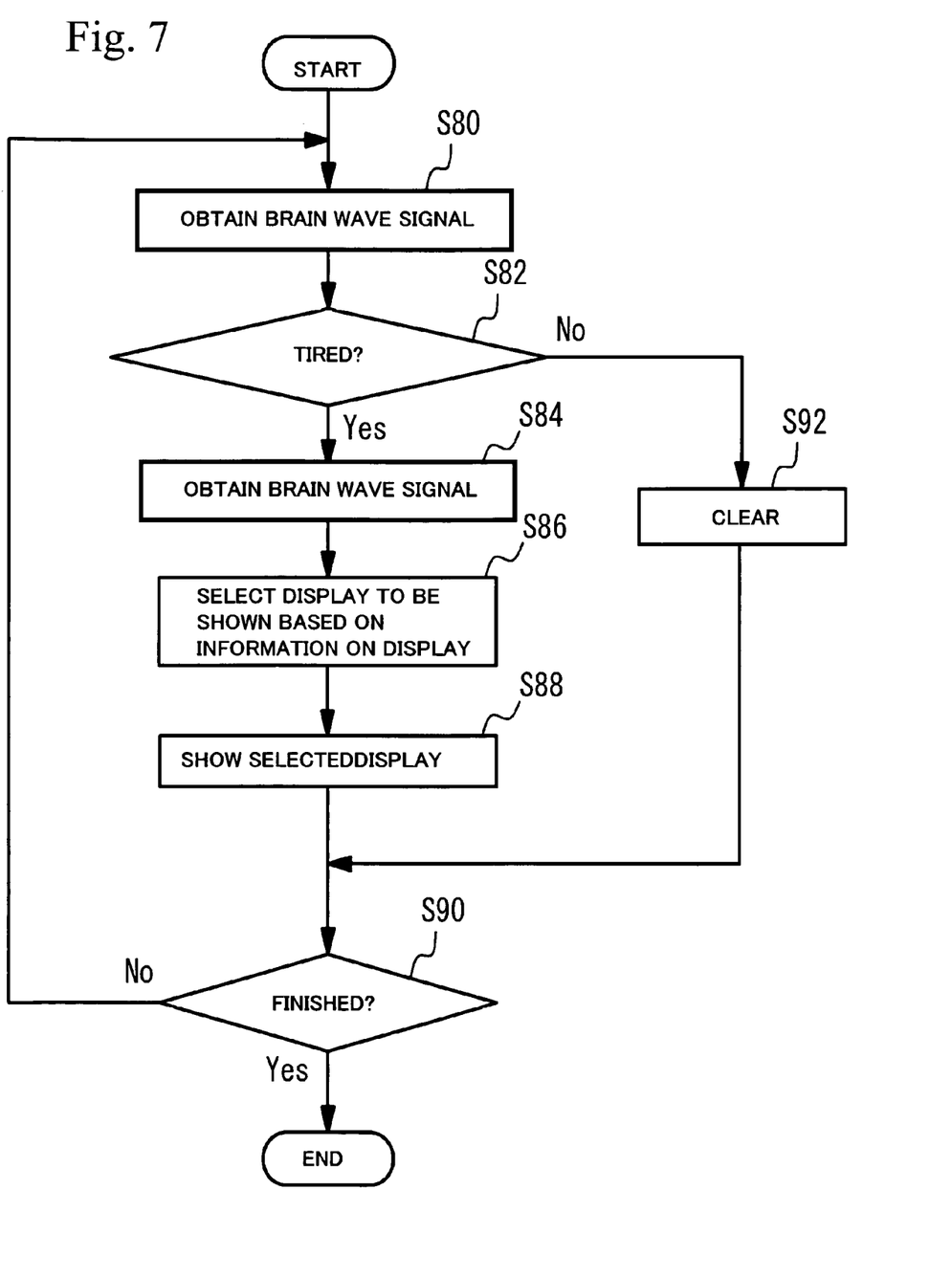
FIG. 7 is another flowchart of an operation after the initial operation in accordance with the third embodiment.

FIG. 7 is a flowchart of an operation after the initial operation of the brain wave receiving apparatus 30 and the information processing terminal 60 in accordance with the third embodiment. With reference to FIG. 7, the receiving portion 31 receives the brain wave information that is transmitted by the brain wave detecting apparatus 10, when the operator 100 starts to work (step S80). The fatigue determining portion 40 determines whether the operator 100 is tired or not by referring to the brain wave information, which is obtained from the receiving portion 31 (step S82). If the answer is Yes, the processing portion 44 obtains the information on the display that is effective to recover the operator 100 from the memory 48 (step S84). The processing portion 44 selects the display to be shown based on the information on the display (step S88). After that, the processing portion 44 proceeds to step S90.

When the answer is No in step S82, the processing portion 44 clears the display, if the display portion 50 shows the display (step S92). The processing portion 44 determines whether the process is finished or not in step S90, to which the process goes after step S92. If the answer is No, the processing portion 44 goes back to step S80 and if the answer is Yes, the process is finished.

According to the third embodiment, in the initial process, when the fatigue determining portion 40 determines the operator 100 is tired by referring to the brain wave information in step S54 in FIG. 6, the processing portion 44 causes a plurality of displays for recovering the operator 100 to be sequentially shown on the display portion 50, on which the operator 100 is working. In step S64, the memory 48 memorizes the information on the display that is effective to recover the operator 100 among the plurality of displays. In the process after the initial process, the receiving portion 31 receives the brain wave information again in step S80 in FIG. 7. In step S82, the fatigue determining portion 40 determines whether the operator 100 is tired or not by referring to the brain wave information. In steps S84 through S88, the processing portion 44 causes the display to be shown on the display portion 50, when the fatigue determining portion 40 determines that the operator 100 is tired. The display is selected among the plurality of displays, with which the operator is recovered. The information on the plurality of displays is memorized in the memory 48.

The display, which is displayed on the display portion 50 by the processing portion 44 in step S58, includes comments such as "Let's have a coffee time.", "Do some exercise, please.", "Please close your eyes for a minute." or "This operation is aborted." By employing the display preferentially that is the most effective to recover the operator 100 among the plurality of such displays, it is expected to enhance effectiveness to recover the operator 100.

In the first through third embodiments, the fatigue determining portion 40 is separated from the information processing terminal 60, the fatigue determining portion 40 may be included in the information processing terminal 60. Further, the brain wave information (for example, the brain wave signal converted to digital signal) is used as fatigue information, the fatigue information may be the information on the operator 100, such as a cutaneous temperature or a size of pupil. Furthermore, sound or vibration may be given to the operator, when the processing portion 44 causes the first and second displays 54 and 56 to be shown on the display portion 50, or makes the operator 100 stop processing the work.

The present invention is not limited to the specifically disclosed embodiments, but other embodiments and variations may be made without departing from the scope of the present invention.

The present application is based on Japanese Patent Application No. 2007-150989 filed Jun. 6, 2007, the entire disclosure of which is hereby incorporated by reference.

What is claimed is:

1. An information processing apparatus comprising:
a fatigue determining portion determining whether an operator is tired or not by referring to fatigue information on the operator's fatigue; and
a processing control portion causing a first display for recovering the operator to be shown on a display portion together with a working display on which the operator is working, when the fatigue determining portion determines that the operator is tired, and
wherein the fatigue determining portion determines again whether the operator is tired or not by referring to fatigue information that is obtained again after the processing control portion causes the first display to be shown on the display portion, and the processing control portion causes a second display for recovering the operator to be shown on the display portion instead of the working display, when the fatigue determining portion determines again that the operator is tired.

2. An information processing apparatus comprising:
a fatigue determining portion determining whether an operator is tired or not by referring to fatigue information on the operator's fatigue; and
a processing control portion causing a first display for recovering the operator to be shown on a display portion together with a working display on which the operator is working, when the fatigue determining portion determines that the operator is tired, and
wherein the fatigue determining portion determines again whether the operator is tired or not by referring to fatigue information that is obtained again after the processing control portion causes the first display to be shown on the display portion, and the processing control portion makes the operator stop processing the work, when the fatigue determining portion determines again that the operator is tired.

3. The information processing apparatus as claimed in claim 1, wherein the fatigue determining portion determines again whether the operator is tired or not by referring to fatigue information that is obtained again after the processing control portion causes the second display to be shown on the display portion, and the processing control portion makes the operator stop processing the work, when the fatigue determining portion determines again that the operator is tired.

4. An information processing apparatus comprising:
a fatigue determining portion determining whether an operator is tired or not by referring to fatigue information on the operator's fatigue; and
a processing control portion causing a first display for recovering the operator to be shown on a display portion on which the operator is working, when the fatigue determining portion determines the operator is tired,
wherein the fatigue determining portion determines again whether the operator is tired or not on the basis of fatigue information that is obtained again after the processing control portion causes the first display to be shown on the display portion, and the processing control portion makes the operator stop processing the work, when the fatigue determining portion determines again that the operator is tired.

* * * * *